United States Patent
Jang et al.

(10) Patent No.: US 8,765,298 B2
(45) Date of Patent: Jul. 1, 2014

(54) ELECTRODE ASSEMBLY HAVING ELECTRODE PLATE WITH CUTOFF PORTION AND RECHARGEABLE BATTERY HAVING THE SAME

(75) Inventors: Miyoung Jang, Yongin-si (KR);
Chanjung Kim, Yongin-si (KR);
Sukjung Son, Yongin-si (KR);
Yunkyung Jo, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 485 days.

(21) Appl. No.: 12/852,400

(22) Filed: Aug. 6, 2010

(65) Prior Publication Data

US 2011/0081570 A1    Apr. 7, 2011

(30) Foreign Application Priority Data

Oct. 1, 2009    (KR) .................. 10-2009-0093803

(51) Int. Cl.
*H01M 2/26* (2006.01)
*H01M 4/72* (2006.01)
*H01M 2/16* (2006.01)

(52) U.S. Cl.
CPC .............. *H01M 4/72* (2013.01); *H01M 2/1673* (2013.01)
USPC ........................... 429/211; 429/233; 429/161

(58) Field of Classification Search
USPC ................ 429/233, 234, 241, 211, 161, 162; 204/282, 290.01
See application file for complete search history.

(56) References Cited

U.S. PATENT DOCUMENTS

| | | |
|---|---|---|
| 2006/0051662 A1 | 3/2006 | Kwak et al. |
| 2007/0202398 A1 | 8/2007 | Kim |
| 2007/0231701 A1 | 10/2007 | Lee |

FOREIGN PATENT DOCUMENTS

| | | | |
|---|---|---|---|
| CN | 201087907 | 7/2008 | |
| EP | 2056376 | 5/2009 | |
| JP | 1994-011258 | 1/1994 | |
| JP | 6-11258 U | 2/1994 | |
| JP | 11-102710 | 4/1999 | |
| JP | 2001-057203 | 2/2001 | |
| JP | 2003-068278 | * 3/2003 | ............ H01M 4/02 |
| JP | 2003-068278 | 7/2003 | |
| JP | 2006-12812 | 7/2003 | |
| JP | 2007 184273 | 7/2007 | |
| KR | 10-1999-0002559 U | 1/1999 | |
| KR | 10-2001-0068754 A | 7/2001 | |
| KR | 10-2008-0037197 | 4/2008 | |

OTHER PUBLICATIONS

European Search Report dated Nov. 22, 2010 for European Application No. 10171897.1.
Office Action dated Sep. 4, 2012 for corresponding JP Application No. 2010-135383.
Office Action issued by SIPO dated Feb. 17, 2013, 10 pages.

* cited by examiner

*Primary Examiner* — Raymond Alejandro
(74) *Attorney, Agent, or Firm* — Knobbe, Martens, Olson & Bear, LLP (57) ABSTRACT

An electrode assembly and a secondary battery having the same are disclosed. The electrode assembly includes a positive electrode plate, a negative electrode plate, and a separator. The positive electrode plate includes a positive electrode active material and a positive electrode tab. The negative electrode plate includes a negative electrode active material and a negative electrode tab. The separator is disposed between the positive electrode plate and the negative electrode plate.

7 Claims, 11 Drawing Sheets

ELECTRODE ASSEMBLY HAVING ELECTRODE PLATE WITH CUTOFF PORTION AND RECHARGEABLE BATTERY HAVING THE SAME

CROSS-REFERENCE TO RELATED APPLICATION

This application claims priority to and the benefit of Korean Patent Application No. 10-2009-0093803, filed on Oct. 1, 2009, the entire content of which is incorporated herein by reference.

BACKGROUND

1. Field

Embodiments relate to an electrode assembly and a rechargeable secondary battery having the same.

2. Description of the Related Technology

Unlike primary batteries, secondary batteries are chargeable or dischargeable. Examples of secondary batteries may include a nickel-hydride battery, a nickel-cadmium battery, and a lithium ion battery. The operating voltage of the lithium secondary battery is typically about 3.7 V, which is approximately three times the operating voltage of the nickel battery that has usually been used as the power source for electric devices. Also, the lithium secondary battery has high energy density per unit weight.

The lithium secondary battery may be classified as a liquid electrolyte battery or a polymer electrolyte battery, according type of electrolyte. Generally, a battery using liquid electrolyte is referred to as a lithium ion battery, and a battery using polymer electrolyte is referred to as a lithium polymer battery.

The lithium secondary battery may be manufactured in various shapes, such as a cylindrical shape and a prismatic shape. Since the lithium polymer battery that has come under the spotlight in recent years is formed of a flexible material, the lithium polymer battery is free in its configuration. In addition, since the lithium polymer battery is superior in safety and light, it is also advantageous for providing thin and lightweight electric devices.

SUMMARY

Embodiments are directed to an electrode assembly that has a uniformly stacked thickness and increased capacity, and prevents an electrode plate from being damaged during the manufacturing process, and a secondary battery having the same.

At least one of the above features and advantages may be realized by providing an electrode assembly including: a positive electrode plate comprising a positive electrode active material and a positive electrode tab; a negative electrode plate comprising a negative electrode active material and a negative electrode tab; and a separator disposed between the positive electrode plate and the negative electrode plate, wherein a negative electrode non-coating portion is disposed on the negative electrode plate corresponding to a position of the positive electrode tab, and a positive electrode non-coating portion is disposed on the positive electrode plate corresponding to a position of the negative electrode tab.

The positive electrode plate may include a positive electrode collector plate having a first surface and a second surface, wherein the positive electrode tab may be attached to the first surface, a positive electrode active material may be coated on the first surface and the second surface except for on the positive electrode tab, and the positive electrode non-coating portion may be disposed on a position of the second surface overlapping the negative electrode tab.

The positive electrode tab may include an attachment section attached to the positive electrode plate, and the negative electrode non-coating portion overlaps the attachment section.

The attachment section may have any one of a rectangular shape, triangular shape, and a curved shape.

The negative electrode plate may include a negative electrode collector plate having a first surface and a second surface, wherein the negative electrode tab may be attached to the first surface, a negative electrode active material may be coated on the first surface and the second surface except for on the negative electrode tab, and the negative electrode non-coating portion may be disposed on a position of the second surface overlapping the positive electrode tab.

The negative electrode tab may include an attachment section attached to the negative electrode plate, and the positive electrode non-coating portion overlaps the attachment section.

The attachment section may have any one of a rectangular shape, triangular shape, and a curved shape.

At least one of the above and other features and advantages may be realized by providing an electrode assembly including: a positive electrode plate comprising a positive electrode active material and a positive electrode tab; a negative electrode plate comprising a negative electrode active material and a negative electrode tab; and a separator disposed between the positive electrode plate and the negative electrode plate, wherein a negative electrode cutoff portion is disposed on the negative electrode plate corresponding to a position of the positive electrode tab, and a positive electrode cutoff portion is disposed on the positive electrode plate corresponding to a position of the negative electrode tab.

The positive electrode plate may include a positive electrode collector plate having a first surface and a second surface, wherein the positive electrode tab may be attached to the first surface, a positive electrode active material may be coated on the first surface and the second surface except for on the positive electrode tab, and the positive electrode cutoff portion may be disposed on a position of the positive electrode collector plate overlapping the negative electrode tab.

The positive electrode tab may include an attachment section attached to the positive electrode plate, and the negative electrode cutoff portion overlaps the attachment section.

The attachment section may have any one of a rectangular shape, triangular shape, and a curved shape.

The negative electrode plate may include a negative electrode collector plate having a first surface and a second surface, wherein the negative electrode tab may be attached to the first surface, a negative electrode active material may be coated on the first surface and the second surface except for on the negative electrode tab, and the negative electrode cutoff portion may be disposed on a position of the negative electrode collector plate overlapping the positive electrode tab.

The negative electrode tab may include an attachment section attached to the negative electrode plate, and the positive electrode cutoff portion overlaps the attachment section.

The attachment section may have any one of a rectangular shape, triangular shape, and a curved shape.

At least one of the above and other features and advantages may be realized by providing a secondary battery including the previously described electrode assembly.

The electrode assembly may be built in a pouch pack.

BRIEF DESCRIPTION OF THE DRAWINGS

The above and other features and advantages will become more apparent to those of ordinary skill in the art by the following detailed descriptions of embodiments with reference to the attached drawings, in which.

DETAILED DESCRIPTION

Various embodiments will now be described more fully hereinafter with reference to the accompanying drawings. However, the embodiments described may be in different forms and should not be construed as limited to the embodiments set forth herein.

Figure 1A:
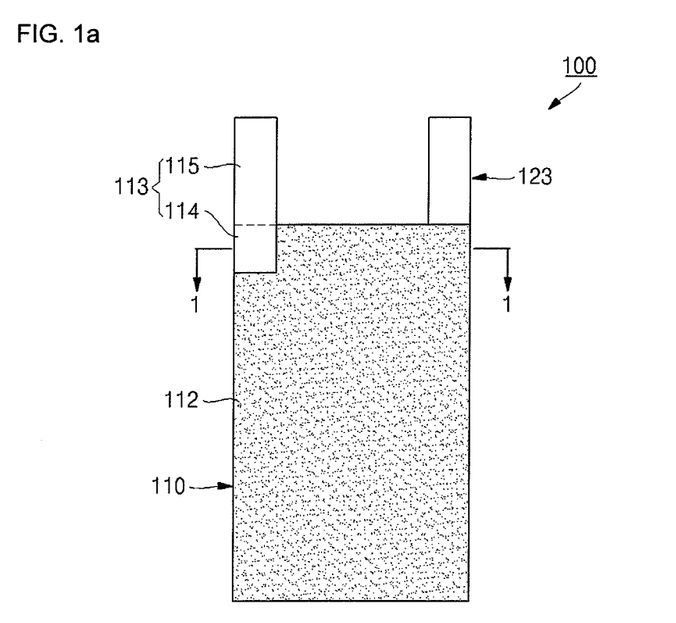
FIGS. 1A, 1B, and 1C illustrate a plan view and an exploded perspective view of an electrode assembly according to an embodiment, and a sectional view taken along line 1-1 of FIG. 1A, respectively.
Figure 1B:
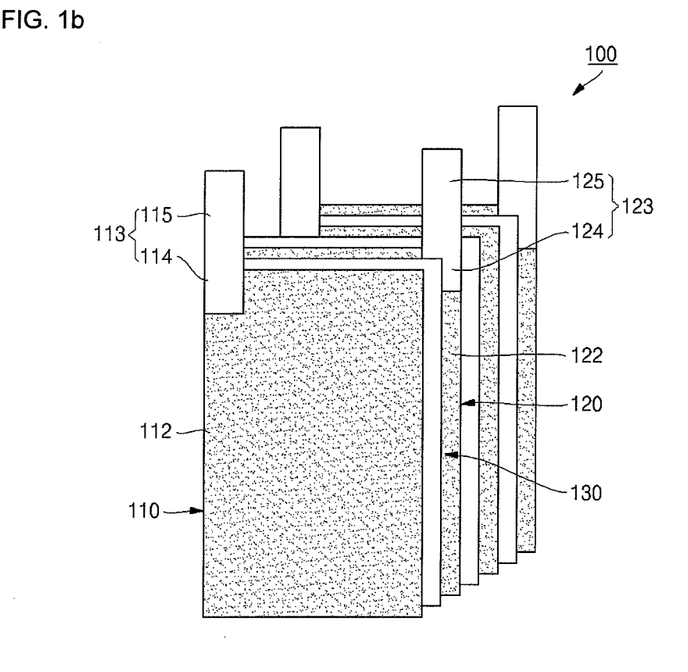
Figure 1C:
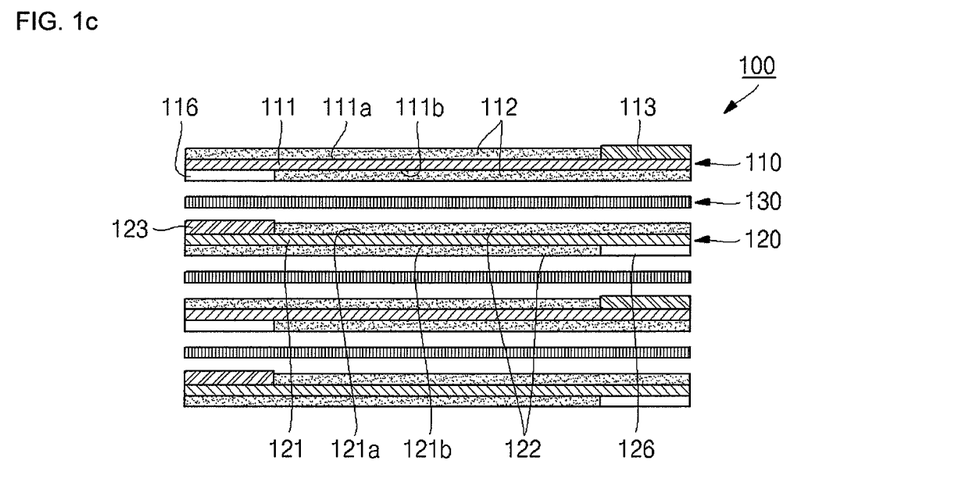

FIGS. 1A, 1B, and 1C illustrate a plan view and an exploded perspective view of an electrode assembly according to an embodiment and a sectional view taken along line 1-1 of FIG. 1A, respectively.

Referring to FIGS. 1A to 1C, an electrode assembly 100 according to an embodiment may include a positive electrode plate 110, a negative electrode plate 120, and a separator 130. The separator 130 may be disposed between the positive electrode plate 110 and the negative electrode plate 120. Also, the electrode assembly 100 according to an embodiment may have a stacked structure including a plurality of positive electrode plates 110, a plurality of negative electrode plates 120, and a plurality of separators 130.

The positive electrode plate 110 may include a positive electrode collector plate 111, a positive electrode active material 112, a positive electrode tab 113, and a positive electrode non-coating portion 116.

The positive electrode collector plate 111 may have a substantially planar first surface 111a and a substantially planar second surface 111b opposite to the first surface 111a. The positive electrode collector plate 111 may be formed of an aluminium foil, an aluminum mesh, and their equivalents, but is not limited thereto.

The positive electrode active material 112 may be coated on the first surface 111a and the second surface 111b of the positive electrode collector plate 111. That is, the positive electrode active material 112 may be coated on the entire first surface 111a except for on the positive electrode tab 113, and the entire second surface 111b except for on the positive electrode non-coating portion 116. Thus, the positive electrode tab 113 may be exposed to the outside through the positive electrode active material 112, and also, the positive electrode non-coating portion 116 may be exposed to the outside through the positive electrode active material 112. The positive electrode non-coating portion 116 may be substantially a section on which the positive electrode active material 112 is not coated. According to the illustrated embodiment, the positive electrode active material 112 may include a lithium-based oxide such as $LiCoO_2$, $LiNiO_2$, and $LiMn_2O_4$, and their equivalents, but is not limited thereto.

The positive electrode tab 113 may be attached to a section on the first surface 111a of the positive electrode collector plate 111 and correspond to a negative electrode non-coating portion 126 of a negative electrode plate 120, further described below. Also, the positive electrode tab 113 may outwardly extend from the positive electrode collector plate 111 by a certain length. That is, the positive electrode tab 113 can include an attachment section 114 attached to the first surface 111a of the positive electrode collector plate 111, and an extension section 115 extending from the attachment section 114 to the outside by a certain length.

The positive electrode non-coating portion 116 may be disposed on a section on the second surface 111b of the positive electrode collector plate 111 and correspond to a negative electrode tab 123 of the negative electrode plate 120. The positive electrode non-coating portion 116 may have a shape corresponding to that of an attachment section 124 of the negative electrode tab 123.

The negative electrode plate 120 may include a negative electrode collector plate 121, a negative electrode active material 122, the negative electrode tab 123, and a negative electrode non-coating portion 126.

The negative electrode collector plate 121 may have a substantially planar first surface 121a and a substantially planar second surface 121b opposite to the first surface 121a. The positive electrode collector plate 111 may be formed of an aluminium foil, an aluminum mesh, and their equivalents, but is not limited thereto.

The negative electrode active material 122 may be coated on the first surface 121a and the second surface 121b of the negative electrode collector plate 121. That is, the negative electrode active material 122 may be coated on the entire first surface 121a except for on the negative electrode tab 123 and the entire second surface 121b except for on the negative electrode non-coating portion 126. Thus, the negative electrode tab 123 may be exposed to the outside through the negative electrode active material 122, and the negative electrode non-coating portion 126 may be exposed to the outside through the negative electrode active material 122. The negative electrode non-coating portion 126 may be substantially a section on which the negative electrode active material 122 is not coated. According to the illustrated embodiment, the negative electrode active material 122 may include any one of graphite and its equivalent, but is not limited thereto.

The negative electrode tab 123 may be attached to a section that is the first surface 121a of the negative electrode collector plate 121 and corresponds to a positive electrode non-coating portion 116 of a positive electrode plate 110. Also, the negative electrode tab 123 may outwardly extend from the negative electrode collector plate 121. That is, the negative electrode tab 123 can include the attachment section 124 attached to the first surface 121a of the negative electrode collector plate 121 and an extension section 125 extending from the attachment section 124 to the outside by a certain length.

The negative electrode non-coating portion 126 may be disposed on a section that is the second surface 121b of the negative electrode collector plate 121 and may correspond to the positive electrode tab 113 of the positive electrode plate 110. The negative electrode non-coating portion 126 may have a shape corresponding to that of the attachment section 114 of the positive electrode tab 113.

The separator 130 may be disposed between the positive electrode plate 110 and the negative electrode plate 120. The separator 130 may include any one of a PE (polyethylene) film, a PP (polypropylene) film, ceramic ($SiO_2$ and $TiO_2$) films, and their equivalents, but is not limited thereto.

As described above, in the electrode assembly 100 according to an embodiment, the negative electrode non-coating portion 126 may be disposed on the negative electrode plate 120 corresponding to the positive electrode tab 113 of the positive electrode plate 110, and also, the positive electrode non-coating portion 116 may be disposed on the positive electrode plate 110 corresponding to the negative electrode tab 123 of the negative electrode plate 120. Thus, according to an embodiment the sections corresponding to the positive electrode tab 113 and the negative electrode tab 123 of the electrode assembly 100 are not relatively thicker than those of the other sections. That is, a thickness of the positive electrode tab 113 may be offset by the negative electrode non-coating portion 126, and a thickness of the negative electrode tab 123 may be offset by the positive electrode non-coating portion 116. Thus, the sections corresponding to the positive electrode tab 113 and the negative electrode tab 123 of the electrode assembly 100 according to an embodiment are not relatively thicker than those of the other sections. In other words, according to an embodiment, the overall electrode assembly 100 has a uniformly stacked thickness.

In addition, in the electrode assembly 100 according to an embodiment, the positive electrode active material 112 is coated on the entire first surface 111a of the positive electrode collector plate 111 except for on the positive electrode tab 113, and the entire second surface 111b of the positive electrode collector plate 111 except for on the positive electrode non-coating portion 116. Also, the negative electrode active material 122 may be coated on the entire first surface 121a of the negative electrode collector plate 121 except for on the negative electrode tab 123 and the entire second surface 121b of the negative electrode collector plate 121 except for on the negative electrode non-coating portion 126. Thus, since the active material is coated on the entire surface except for on the tabs 113 and 123 and the non-coating portions 116 and 126, the electrode assembly 100 and the secondary battery including the electrode assembly 100 can increase in capacity.

In descriptions below, since a positive electrode plate 110 has substantially the same structure as a negative electrode plate 120, the structure of the positive electrode plate 110 will be described as an example.

Figure 2A:
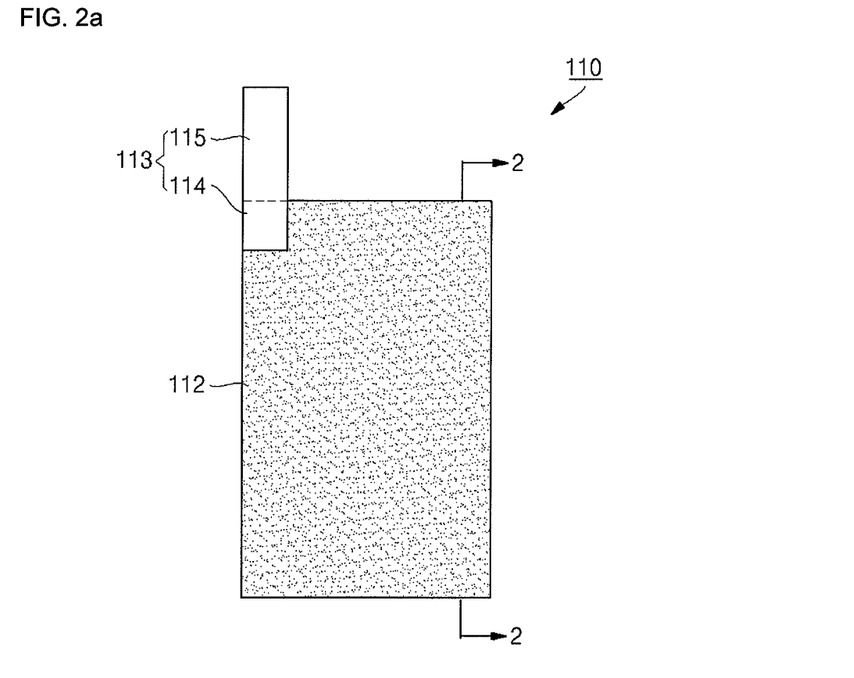
FIGS. 2A, 2B, and 2C illustrate a plan view of an example of a positive electrode plate in an electrode assembly according to an embodiment, a sectional view taken along line 2-2 of FIG. 2A, and a bottom view of the positive electrode plate, respectively.
Figure 2B:
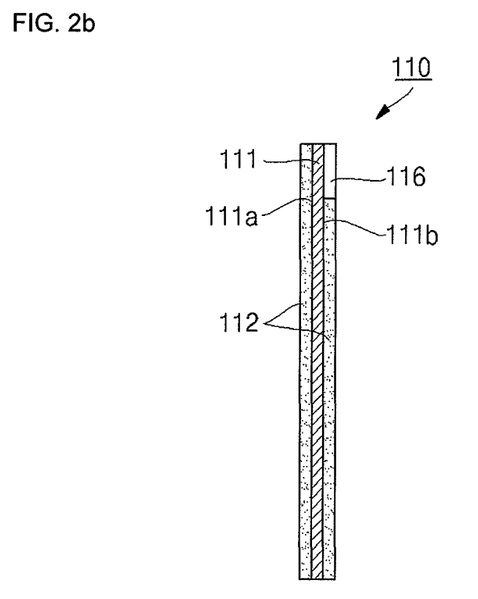
Figure 2C:
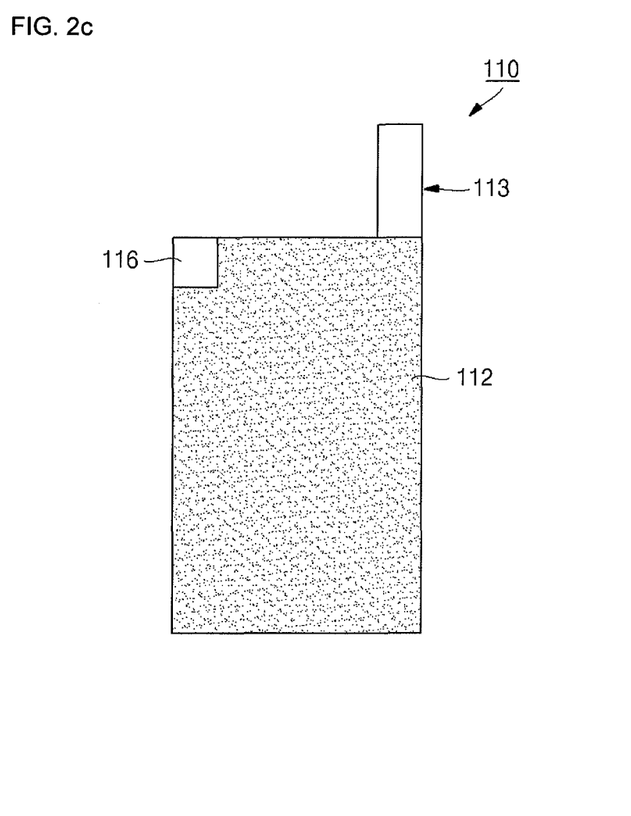

FIGS. 2A, 2B, and 2C illustrate a plan view of an example of a positive electrode plate in an electrode assembly according to an embodiment, a sectional view taken along line 2-2 of FIG. 2A, and a bottom view of the positive electrode plate, respectively.

Referring to FIGS. 2A to 2C, a positive electrode plate includes a positive electrode collector plate 111 having a first surface 111a and a second surface 111b, a positive electrode active material 112 respectively coated on the first surface 111a and the second surface 111b of the positive electrode collector plate 111, a positive electrode tab 113 attached to the first surface 111a of the positive electrode collector plate 111, and a positive electrode non-coating portion 116 disposed on the second surface 111b of the positive electrode collector plate 111.

The positive electrode tab 113 includes an attachment section attached to the first surface 111a of the positive electrode collector plate 111 and an extension section 115 outwardly extending from the attachment section 114 by a certain length. The attachment section 114 may have various shapes according to embodiments. Also, the positive electrode non-coating portion 116 may be spaced from the attachment section 114 and disposed on the second surface 111b of the positive electrode collector plate 111 in a shape corresponding to that of the attachment section 114. The positive electrode non-coating portion 116 may have various shapes.

The positive electrode tab 113 is disposed at one side edge of the first surface 111a of the positive electrode collector plate 111, and the positive electrode non-coating portion 116 is disposed at the other side edge of the second surface 111b of the positive electrode collector plate 111.

The attachment section 114 may have an approximately rectangular shape. That is, in the positive electrode tab 113, the attachment section 114 may have the same width as the extension section 115. As a result, the positive electrode non-coating portion 116 may have a rectangular shape.

Although not shown, according to an embodiment of the positive electrode plate 110, a negative electrode non-coating portion of a negative electrode plate corresponding to the attachment section 114 of the positive electrode tab 113 may have a rectangular shape. Also, an attachment section of the negative electrode tab corresponding to the positive electrode non-coating portion 116 may have a rectangular shape.

Figure 3A:
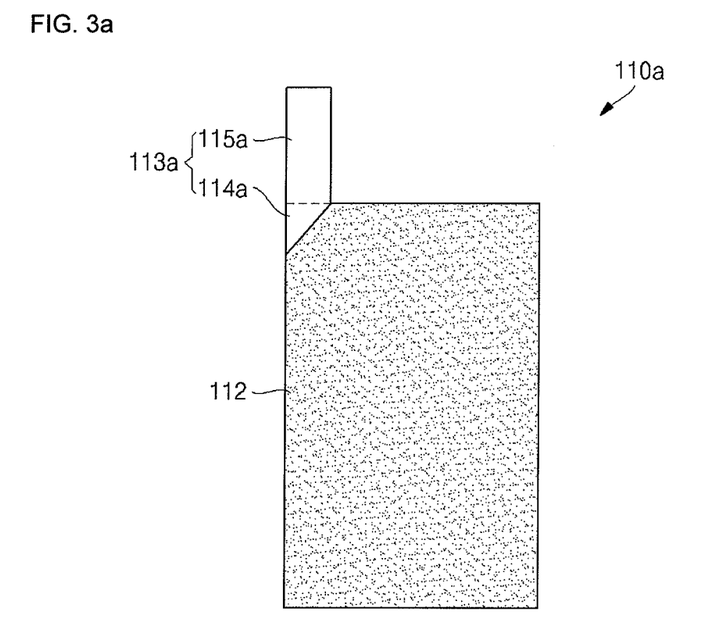
FIGS. 3A and 3B illustrate a plan view and a bottom view of another example of a positive electrode plate in an electrode assembly according to an embodiment.
Figure 3B:
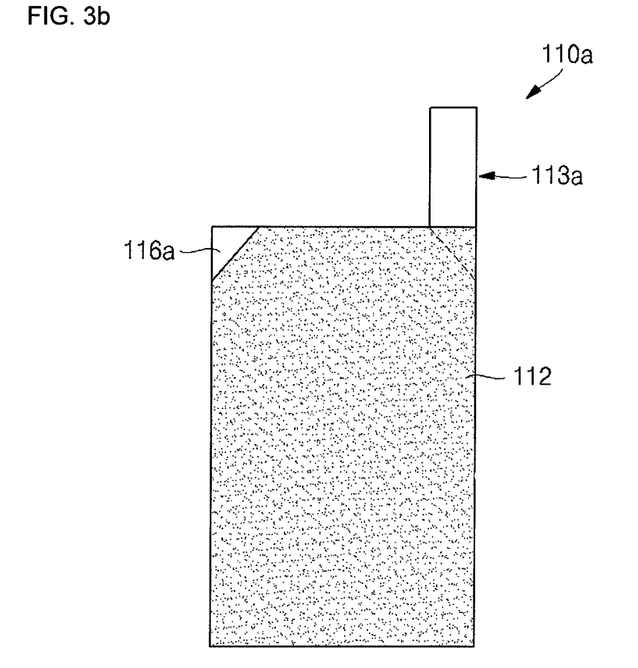

FIGS. 3A and 3B illustrate a plan view and a bottom view of another example of a positive electrode plate in an electrode assembly according to an embodiment.

Referring to FIGS. 3A and 3B, another embodiment of a positive electrode plate 110a of an electrode assembly is nearly similar to that of the previously described positive electrode plate 110, and therefore only a difference therebetween will be described below.

In a positive electrode tab 113a including an attachment section 114a and an extension section 115a, the attachment section 114a may have a triangular shape or a rectangular shape. That is, a width of the attachment section 114a may decrease as it moves away from the extension section 114a. As a result, an end of the attachment section may be tapered. Also, a positive electrode non-coating portion 116a may have a triangular shape or a rectangular shape. Thus, the attachment section 114a may have the triangular shape having an approximately half area of the rectangular shape, and the positive electrode non-coating portion 116a may have the triangular shape having an approximately half area of the rectangular shape. Thus, the coating amount of the positive electrode active material 112 may increase by the reduced area. Therefore, the electrode assembly and the secondary battery including the electrode assembly may increase relatively in capacity.

Although not shown, like the positive electrode plate 110a, an attachment section of a negative electrode tab of a negative electrode plate may have a triangular shape, and also, a negative electrode non-coating portion may have a triangular shape.

Thus, when the positive electrode plate and the negative electrode plate having the above-described structure are stacked several times according to an embodiment, the sections corresponding to the positive electrode tab and the negative electrode tab are not relatively thicker than those of the other sections. That is, the overall electrode assembly may have a uniform thickness. Since the coating amounts of positive electrode active material and negative electrode active material can increase on the positive electrode plate and the negative electrode plate, respectively, the electrode assembly and a secondary battery including the electrode assembly may further increase relatively in capacity.

Figure 4A:
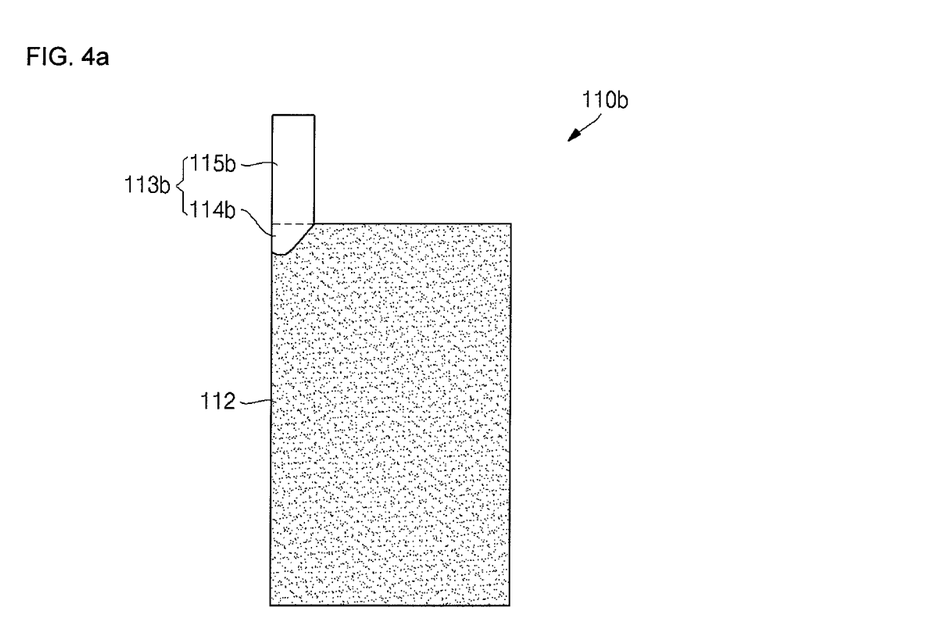
FIGS. 4A and 4B illustrate a plan view and a bottom view of another example of a positive electrode plate in an electrode assembly according to an embodiment.
Figure 4B:
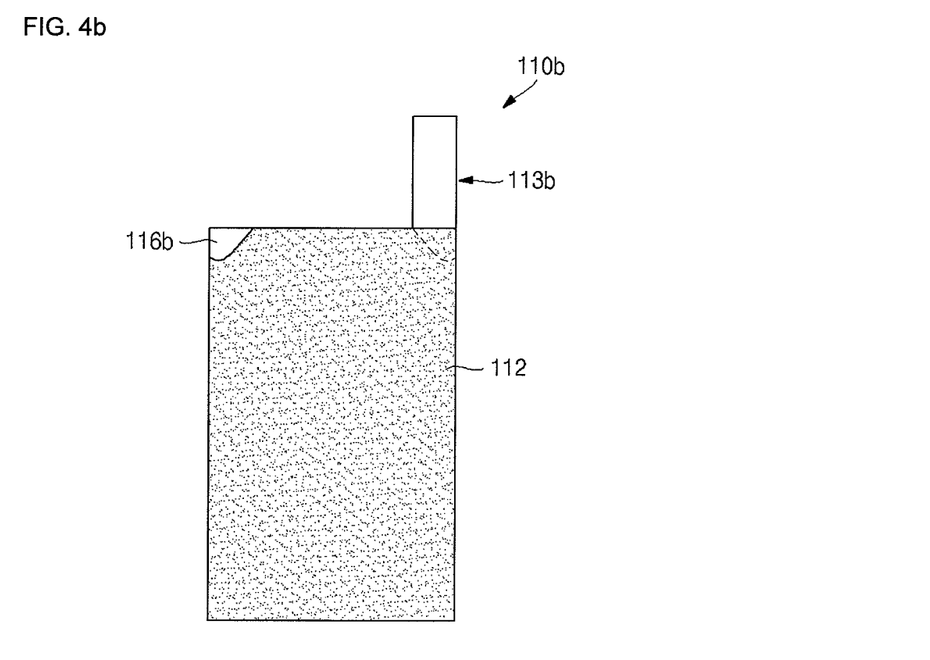

FIGS. 4A and 4B illustrate a plan view and a bottom view of another example of a positive electrode plate in an electrode assembly according to an embodiment.

Referring to FIGS. 4A and 4B, a structure of a positive electrode plate 110b of an electrode assembly according to another embodiment is nearly similar to that of the previously described positive electrode plate, and therefore only a difference therebetween will be described below.

In a positive electrode tab 113b including an attachment section 114b and an extension section 115b, the attachment section 114b may have a curved shape or a triangular shape. As a result, a positive electrode non-coating portion 116b may have a curved shape or a triangular shape. That is, the attachment section 114b with the curved shape has an area much less than that of the rectangular shape, and also, an end of the attachment section 114b has a blunt shape or a tapered shape. Also, the positive electrode non-coating portion 116b with a curved shape has an area much less than that of a rectangular shape, and also, an end of the positive electrode non-coating portion 116b has a blunt shape or a tapered shape. Thus, a coating amount of positive electrode active material 112 increases by the reduced area. Therefore, the electrode assembly and a secondary battery including the electrode assembly may increase relatively in capacity.

Since the attachment section 114b of the positive electrode tab 113b does not have a sharp portion as shown in rectangular and triangular shapes, the positive electrode collector plate or the positive electrode active material may not be damaged by the positive electrode tab 113b during the manufacturing process of the electrode assembly. That is, the positive electrode collector plate or the positive electrode active material may be prevented from being damaged by the positive electrode tab 113b during the manufacturing process of the electrode assembly.

Although not shown, like the positive electrode plate 110b, an attachment section of a negative electrode tab of a negative electrode plate may have a curved shape, and a negative electrode non-coating portion may also have a curved shape.

Thus, when the positive electrode plate and the negative electrode plate having the above-described structure are stacked several times according to an embodiment, the sections corresponding to the positive electrode tab and the negative electrode tab are not relatively thicker than those of the other sections. That is, the overall electrode assembly may have a uniform thickness. Since the coating amounts of positive electrode active material and negative electrode active material may increase on the positive electrode plate and the negative electrode plate, respectively, the electrode assembly and a secondary battery including the electrode assembly may further increase relatively in capacity. Furthermore, since the attachment sections of the positive electrode tab and the negative electrode tab may have curved shapes, the positive electrode plate and the negative electrode plate may be prevented from being damaged by impacts of the positive electrode tab and the negative electrode tab when the positive electrode tab and the negative electrode tab are attached to the positive electrode plate and the negative electrode plate, respectively.

Figure 5A:
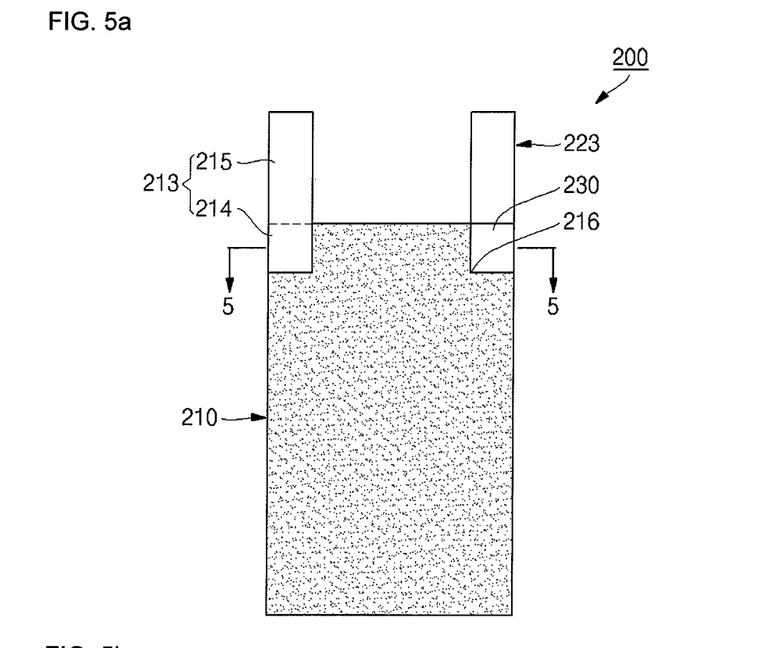
FIGS. 5A, 5B, and 5C illustrate a plan view and an exploded perspective view of an electrode assembly according to another embodiment and a sectional view taken along line 5-5 of FIG. 5A, respectively.
Figure 5B:
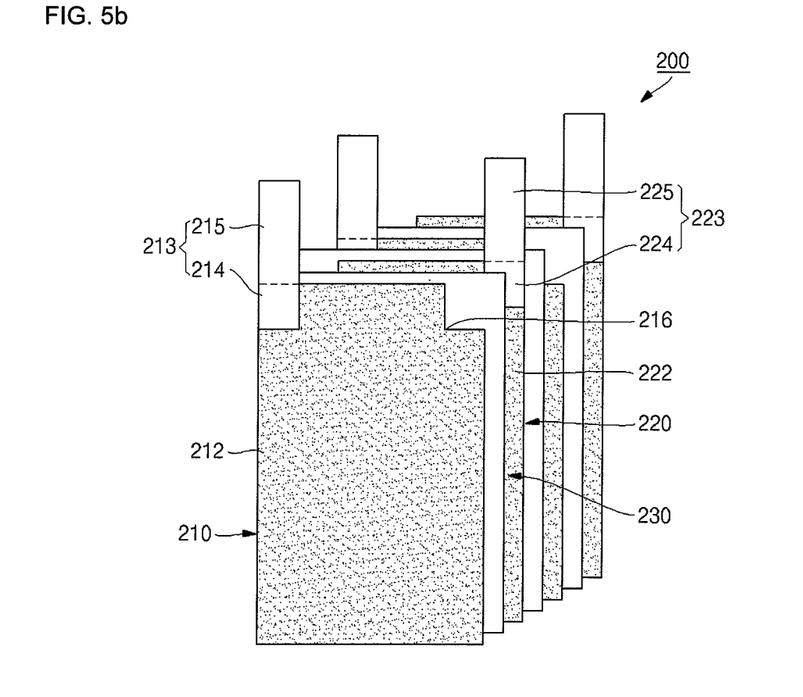
Figure 5C:
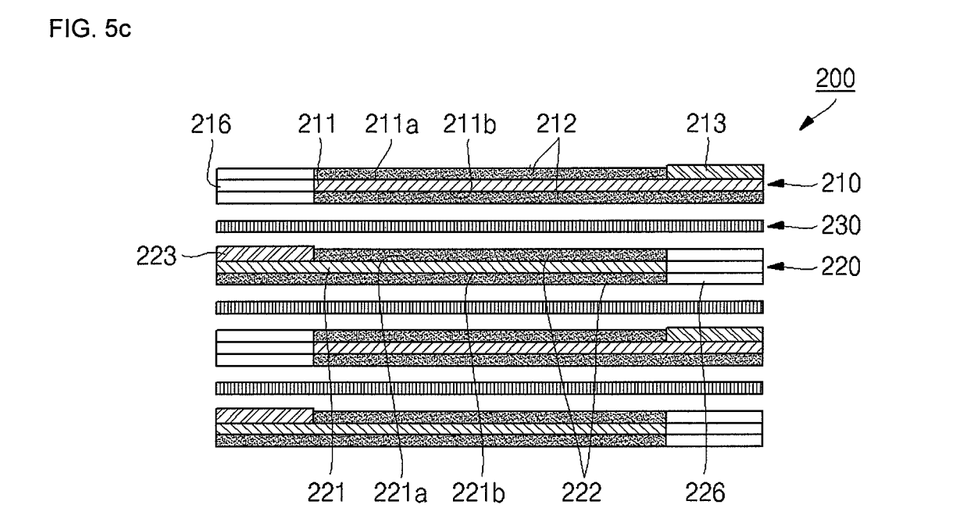

FIGS. 5A, 5B, and 5C illustrate a plan view and an exploded perspective view of an electrode assembly according to another embodiment, and a sectional view taken along line 5-5 of FIG. 5A, respectively.

Referring to FIGS. 5A to 5C, an electrode assembly 200 according to another embodiment includes a positive electrode plate 210, a negative electrode plate 220, and a separator 230.

The positive electrode plate 210 may include a positive electrode collector plate 211, a positive electrode active material 212, a positive electrode tab 213, and a positive electrode cutoff portion 216. In the illustrated embodiment, since structures of the positive electrode collector plate 211, the positive electrode active material 212, and the positive electrode tab 213 are similar to those that are previously described, their detailed descriptions will will not be provided.

The positive electrode tab 213 may be attached to a section that is a first surface 211a of the positive electrode collector plate 211 and corresponds to a negative electrode cutoff portion 226 of a negative electrode plate 220 that will be described later.

The positive electrode cutoff portion 216 may be disposed in a section corresponding to a negative electrode tab 223 of the negative electrode plate 220 that will be described later. That is, the positive electrode plate 210 may be cut into a shape corresponding to an attachment section 224 of the negative electrode tab 223 to form the positive electrode cutoff portion 216. In other words, the positive electrode cutoff portion 216 can be a portion on which the positive electrode collector plate 211 is not disposed, and the positive electrode active material 212 is not coated.

The negative electrode plate 220 can include a negative electrode collector plate 221, a negative electrode active material 222, a negative electrode tab 223, and a negative electrode cutoff portion 226. Here, since structures of the negative electrode collector plate 221, the negative electrode active material 222, the negative electrode tab 223 are similar to those that are previously described, their detailed descriptions will not be provided.

The negative electrode tab 223 may be attached to a section that is a first surface 221a of the negative electrode collector plate 221 and corresponds to the positive electrode cutoff portion 216 of the positive electrode plate 210.

The negative electrode cutoff portion 226 may be disposed in a section corresponding to the positive electrode tab 213 of the positive electrode plate 210. That is, the negative electrode plate 220 may be cut into a shape corresponding to the attachment section 214 of the positive electrode tab 213 to form the negative electrode cutoff portion 226. In other words, the negative electrode cutoff portion 226 can be a portion on which the negative electrode collector plate 221 is not disposed, and the negative electrode active material 222 is not coated.

As described above, in the electrode assembly 200 according to another embodiment, the negative electrode cutoff portion 226 may be disposed in the negative electrode plate corresponding to the positive electrode tab 213 of the positive electrode plate 210, and the positive electrode cutoff portion 216 may be disposed in the positive electrode plate 210 corresponding to the negative electrode tab 223 of the negative electrode plate 220. Thus, according to embodiments, the sections corresponding to the positive electrode tab and the negative electrode tab of the electrode assembly 200 are not relatively thicker than those of the other sections. That is, a thickness of the positive electrode tab 213 may be offset by the negative electrode cutoff portion 226, and a thickness of the negative electrode tab 223 may be offset by the positive electrode cutoff portion 216. Thus, according to embodiments, the sections corresponding to the positive electrode tab 213 and the negative electrode tab 223 of the electrode assembly 100 are not relatively thicker than those of the other sections. In other words, the overall electrode assembly 100 may have a uniformly stacked thickness.

In addition, in the electrode assembly 100 according to another embodiment, the positive electrode active material 212 may be coated on the entire first surface 211a of the positive electrode collector plate 211 except for on the positive electrode tab 213, and the entire second surface 211b of the positive electrode collector plate 211 except for on the positive electrode cutoff portion 216. Also, the negative electrode active material 222 may be coated on the entire first surface 221a of the negative electrode collector plate 221 except for on the negative electrode tab 223, and the entire second surface 221b of the negative electrode collector plate 221 except for on the negative electrode cutoff portion 226. Thus, since the active material may be coated on the entire surface except for on the tabs 213 and 223 and the cutoff portions 216 and 226, the electrode assembly 100 and the secondary battery including the electrode assembly 100 can increase in capacity.

In descriptions below, since a positive electrode plate 210 has substantially the same structure as a negative electrode plate 220, the structure of the positive electrode plate 210 will be described as an example.

Figure 6A:
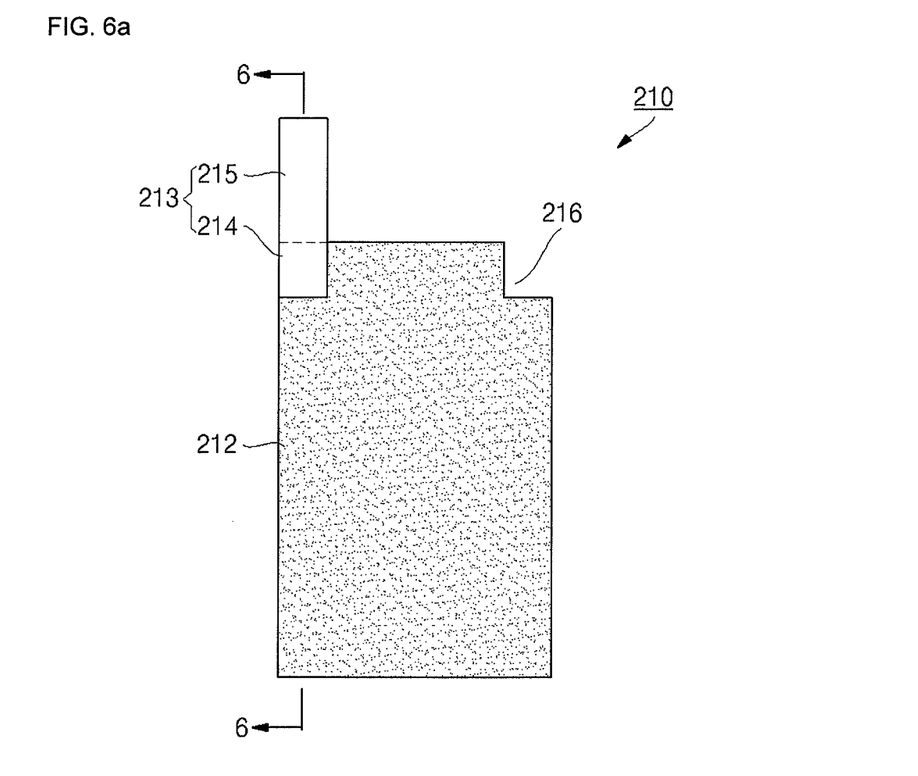
FIGS. 6A, 6B, and 6C illustrate a plan view of an example of a positive electrode plate in an electrode assembly according to another embodiment, a sectional view taken along line 6-6 of FIG. 6A, and a bottom view of the positive electrode plate, respectively.
Figure 6B:
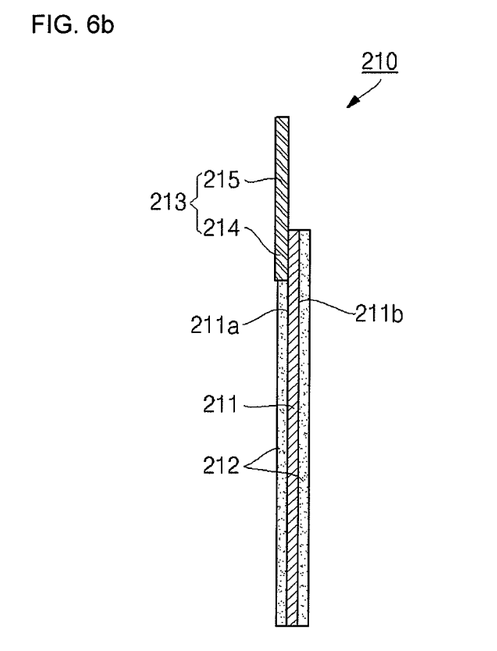
Figure 6C:
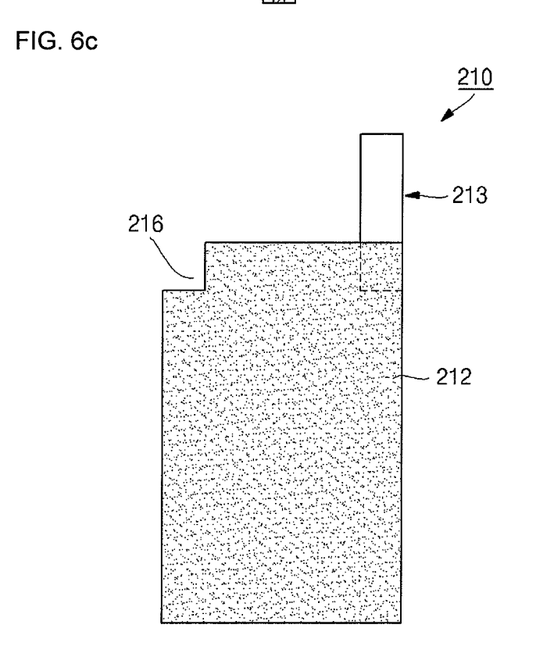

FIGS. 6A, 6B, and 6C illustrate a plan view of an example of a positive electrode plate in an electrode assembly according to another embodiment, a sectional view taken along line 6-6 of FIG. 6A, and a bottom view of the positive electrode plate, respectively.

Referring to FIGS. 6A to 6C, a positive electrode plate 210 can include a positive electrode collector plate 211 having a first surface 211a and a second surface 211b, a positive electrode active material respectively coated on the first surface 211a and the second surface 211b, a positive electrode tab 213 attached to the first surface 211a of the positive electrode collector plate 211, and a positive electrode cutoff portion 216 formed by cutting the positive electrode collector plate 211.

In the illustrated embodiment, the positive electrode tab 213 can include an attachment section to the first surface 211a of the positive electrode collector plate 211 and an extension section 215 outwardly extending from the attachment section 214 by a certain length. Also, the positive electrode cutoff portion 216 may be spaced from the attachment section 214 and have a shape corresponding to that of the attachment section 214. For example, when the attachment section 214 has a rectangular shape, the positive electrode cutoff portion 216 has a rectangular shape. The positive electrode cutoff portion 216 may have two sides substantially perpendicular to each other.

As described above, although not shown, a negative electrode plate may have the same structure as the positive electrode plate 210. Thus, when the positive electrode plate and the negative electrode plate having the above-described structure are stacked several times, the sections corresponding to the positive electrode tab and the negative electrode tab are not relatively thicker than those of the other sections.

Figure 7A:
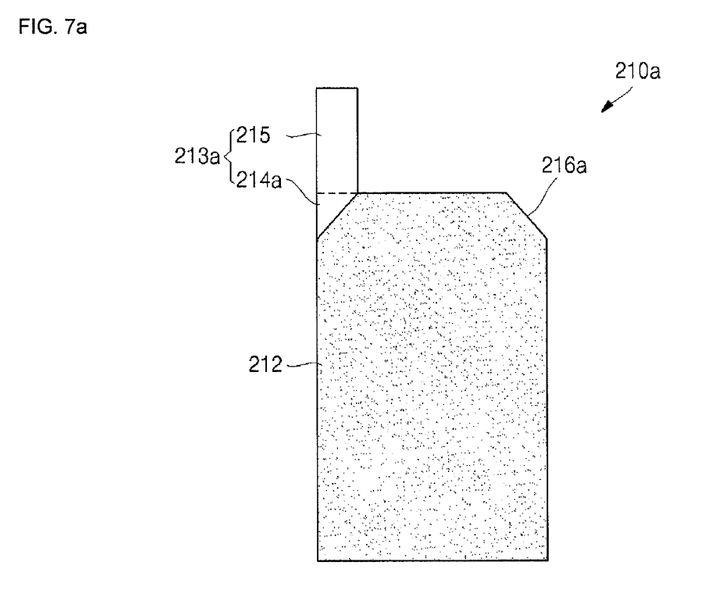
FIGS. 7A and 7B illustrate a plan view and a bottom view of another example of a positive electrode plate in an electrode assembly according to another embodiment.
Figure 7B:
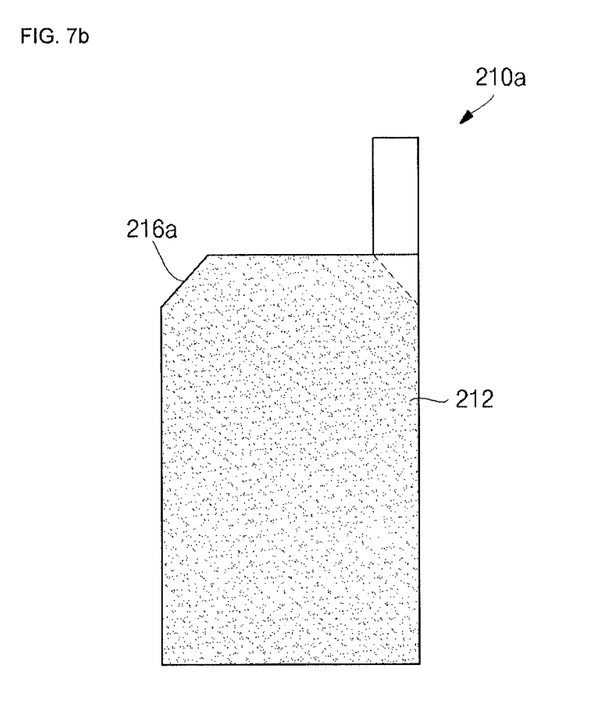

FIGS. 7A and 7B illustrate a plan view and a bottom view of another example of a positive electrode plate in an electrode assembly according to another embodiment.

Referring to FIGS. 7A and 7B, in a positive electrode plate 210a according to another embodiment, a positive electrode tab 213a and a positive electrode cutoff portion 216a may be different from those that are previously described.

An attachment section 214a of the positive electrode tab 213a may have a substantially triangular shape, and also, the positive electrode cutoff portion 216a may have a triangular shape. The positive electrode cutoff portion 216a may have one substantially straight surface.

Thus, a coating amount of a positive electrode active material 212 may relatively increase. When the positive electrode plate 210a and a negative electrode plate having the above-described structure are stacked several times, the sections corresponding to the positive electrode tab and the negative electrode tab are not relatively thicker than those of the other sections. Thus, the electrode assembly may have a uniform thickness.

Figure 8A:
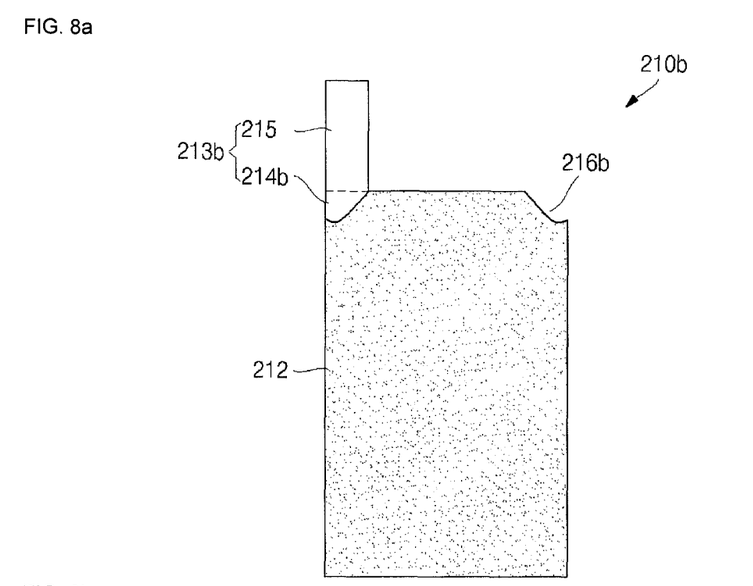
FIGS. 8A and 8B illustrate a plan view and a bottom view of another example of a positive electrode plate in an electrode assembly according to another embodiment.
Figure 8B:
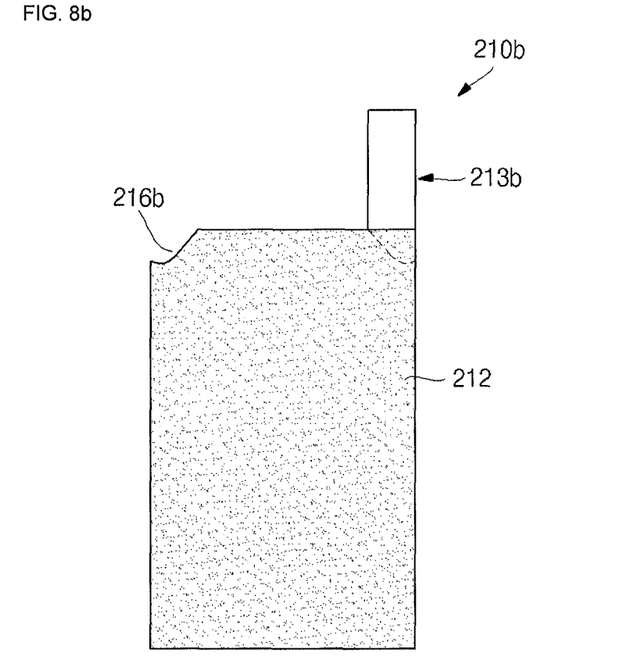

FIGS. 8A and 8B illustrate a plan view and a bottom view of another example of a positive electrode plate in an electrode assembly according to another embodiment.

Referring to FIGS. 8A and 8B, in a positive electrode plate 210b according to another embodiment, a positive electrode tab 213b and a positive electrode cutoff portion 216b are different from those that are previously described.

An attachment section 214b of the positive electrode tab 213b may have a substantially curved shape, and also, the positive electrode cutoff portion 216b may have a curved shape. The positive electrode cutoff portion 216b may have one substantially curved surface.

Thus, a coating amount of a positive electrode active material 212 may relatively increase. When the positive electrode plate 210b and a negative electrode plate having the above-described structure are stacked several times, the sections corresponding to the positive electrode tab and the negative electrode tab are not relatively thicker than those of the other sections. Thus, the electrode assembly may have a uniform thickness. Furthermore, the attachment section 214b of the positive electrode tab 213b may not have a sharp portion as shown in rectangular and triangular shapes. Thus, since an end of the positive electrode tab 213b may be blunt, the positive electrode plate 210b may not be damaged during the manufacturing process of an electrode assembly 200.

Figure 9:
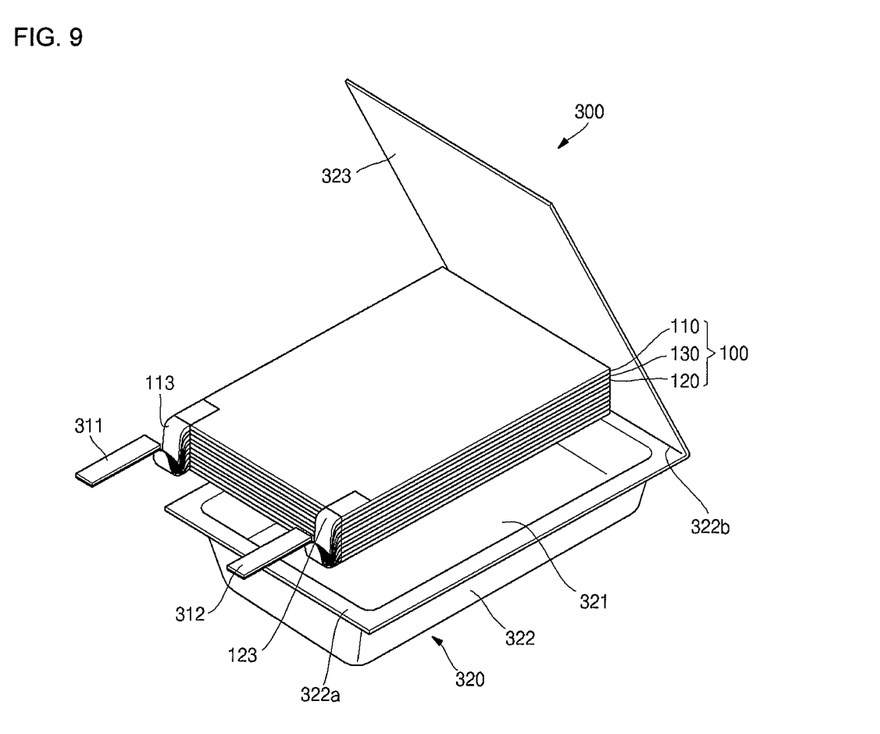
FIG. 9 illustrates an exploded perspective view of a secondary battery according to another embodiment.

FIG. 9 illustrates an exploded perspective view of a secondary battery according to another embodiment.

Referring to FIG. 9, a secondary battery 300 according to another embodiment includes an electrode assembly 100 and a pouch case 320 in which the electrode assembly 100 is mounted. Alternatively, the previously described electrode assembly 200 instead of the electrode assembly 100 may be mounted within the pouch case 320.

As described above, the electrode assembly 100, a positive electrode plate 110, a negative electrode plate 120, and a separator 130 may be stacked to form the electrode assembly 100. All positive electrode tabs 113 connected to the positive electrode plate 110 may be welded to one positive electrode lead 311 having a relatively thick thickness. Also, all negative electrode tabs 123 connected to the negative electrode plate 120 may be welded to one negative electrode lead 312 having a relatively thick thickness. The positive electrode lead 311 and the negative electrode lead 312 can outwardly extend from the pouch case 320 by a certain length.

The pouch case 320 can include a bottom case 322 having cavity 321 for installing the electrode assembly 100 and a top case 323 covering the bottom case 322. A fusing portion 322a may be thermally fused with the top case is disposed on three of four edges of a circumference of the bottom case 322. A folded line 322b may be disposed at a boundary between the bottom case 322 and the top case 323. Here, liquid electrolyte or polymer electrolyte together with the electrode assembly 110 may be received into the pouch case 320.

As described above, since the secondary battery 300 according to another embodiment includes the electrode assembly 100 in which a coating amount of the active material relatively increases, the secondary battery 300 increases in capacity. Also, the attachment sections 114 of a positive electrode tab 113 and a negative electrode tab 123 may have curved shapes to minimize damage of the positive electrode plate 110 and the negative electrode plate 120 during the manufacturing process of the secondary battery 300. In addition, since a non-coating portion or a cutoff portion may be disposed on a section corresponding to the attachment sections 114 of the positive electrode tab 113 and the negative electrode tab 123, the positive electrode plate 110 and the negative electrode plate 120 may have uniform thicknesses.

According to an embodiment, since the non-coating portion or the cutoff portion may be disposed on a section overlapping the tab, the electrode assembly may have the uniformly stacked thickness.

According to another embodiment, since the active material may be coated on the entire surface except for on the tab, the battery can increase in capacity.

According to another embodiment, since the attachment section of the tab has the curved shape, the electrode plate may be prevented from being damaged by the tab during the manufacturing process of the secondary battery.

Certain embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An electrode assembly comprising:
   a positive electrode plate comprising a positive electrode active material, a positive electrode tab and a positive electrode collector plate having a first surface and a second surface,
   a negative electrode plate comprising a negative electrode active material and a negative electrode tab; and
   a rectangular separator disposed between the positive electrode plate and the negative electrode plate,
   wherein a negative electrode cutoff portion provides a space disposed on the negative electrode plate corresponding to a position of the positive electrode tab, and a positive electrode cutoff portion provides a space disposed on the positive electrode plate corresponding to a position of the negative electrode tab;
   wherein the positive electrode tab is attached to the first surface of the positive electrode collector plate, a positive electrode active material is coated on the entire second surface of the positive electrode collector plate and the entire first surface of the positive electrode collector plate except for the portion of the first surface of the positive electrode collector plate on which the positive electrode tab is attached, and the positive electrode cutoff portion is disposed on a position of the positive electrode collector plate overlapping the negative electrode tab.

2. The electrode assembly as claimed in claim 1, wherein the positive electrode tab comprises an attachment section attached to the positive electrode plate, and the negative electrode cutoff portion overlaps the attachment section.

3. The electrode assembly as claimed in claim 2, wherein the attachment section has any one of a rectangular shape, triangular shape, and a curved shape.

4. The electrode assembly as claimed in claim 1, wherein the negative electrode plate comprises a negative electrode collector plate having a first surface and a second surface,
   wherein the negative electrode tab is attached to the first surface, a negative electrode active material is coated on the first surface and the second surface except for on the negative electrode tab, and the negative electrode cutoff portion is disposed on a position of the negative electrode collector plate overlapping the positive electrode tab.

5. The electrode assembly as claimed in claim 1, wherein the negative electrode tab comprises an attachment section attached to the negative electrode plate, and the positive electrode cutoff portion overlaps the attachment section.

6. The electrode assembly as claimed in claim 5, wherein the attachment section comprises a rectangular shape, triangular shape, or a curved shape.

7. The electrode assembly as claimed in claim 1,
   wherein the positive electrode plate comprises a plurality of positive electrode plate,
   wherein the negative electrode plate comprises a plurality of negative electrode plate,
   wherein each positive electrode tab of the plurality of positive electrode plate is stacked, and
   wherein each negative electrode tab of the plurality of negative electrode plate is stacked.

\* \* \* \* \*

UNITED STATES PATENT AND TRADEMARK OFFICE
CERTIFICATE OF CORRECTION

PATENT NO. : 8,765,298 B2  Page 1 of 1
APPLICATION NO. : 12/852400
DATED : July 1, 2014
INVENTOR(S) : Miyoung Jang et al.

It is certified that error appears in the above-identified patent and that said Letters Patent is hereby corrected as shown below:

Title Page (Item 56)    15    Under Foreign Patent Documents,
Col. 2         change "7/2003" to --1/2006--.

(Item 57)    10    After "plate."
Abstract     insert --A negative electrode cutoff portion provides a space disposed on the negative electrode plate corresponding to a position of the positive electrode tab. A positive electrode cutoff portion provides a space disposed on the positive electrode plate corresponding to a position of the negative electrode tab.--.

Signed and Sealed this
Twenty-fourth Day of March, 2015

Michelle K. Lee
*Director of the United States Patent and Trademark Office*